(12) United States Patent
Koster et al.

(10) Patent No.: US 10,365,140 B2
(45) Date of Patent: Jul. 30, 2019

(54) MEASURED DOSE DISPENSERS AND METHODS OF USING SAME

(71) Applicant: WESTROCK DISPENSING SYSTEMS R&D NETHERLANDS B.V., Roosendaal (NL)

(72) Inventors: Stefan Koster, Rotterdam (NL); Eelco DeMan, Vlijmen (NL)

(73) Assignee: Silgan Dispensing Systems Netherlands B.V., Waalwijk (NL)

( * ) Notice: Subject to any disclaimer, the term of this patent is extended or adjusted under 35 U.S.C. 154(b) by 1 day.

(21) Appl. No.: 15/740,057

(22) PCT Filed: May 27, 2016

(86) PCT No.: PCT/IB2016/053157
§ 371 (c)(1),
(2) Date: Dec. 27, 2017

(87) PCT Pub. No.: WO2017/001954
PCT Pub. Date: Jan. 5, 2017

(65) Prior Publication Data
US 2018/0188091 A1    Jul. 5, 2018

Related U.S. Application Data

(60) Provisional application No. 62/186,216, filed on Jun. 29, 2015.

(51) Int. Cl.
*G01F 11/10* (2006.01)
*G01F 11/04* (2006.01)
(Continued)

(52) U.S. Cl.
CPC ............ *G01F 11/04* (2013.01); *G01F 11/265* (2013.01); *G01F 11/286* (2013.01)

(58) Field of Classification Search
CPC .... G01F 11/265; G01F 11/082; G01F 11/263; G01F 11/286; G01F 13/006; B67D 7/0222; B05B 11/043; B65D 35/40
(Continued)

(56) References Cited

U.S. PATENT DOCUMENTS 2,165,570 A * 7/1939 Olson .................. G01F 11/263
222/442
2,904,227 A * 9/1959 Graham .................. G01F 11/04
222/207

(Continued)

FOREIGN PATENT DOCUMENTS

EP    2653842 A1    10/2013
GB    2462820 A     2/2010

*Primary Examiner* — Charles Cheyney
(74) *Attorney, Agent, or Firm* — Barlow Josephs and Holmes LTD; Stephen Holmes

(57) ABSTRACT

A dispensing closure for dispensing flowable product from a squeeze container includes a closure body having an upper deck and a dispensing orifice within the upper deck. A timing piston extends downwardly from the upper deck and is located adjacent to the dispensing orifice. The timing piston is movable between an open position wherein a flared piston neck is spaced from the dispensing orifice, and a closed position wherein the flared piston neck closes off the dispensing orifice. A timing vent within the upper deck is in communication with a piston chamber to allow air to escape the piston chamber. An air intake orifice within the upper deck allows air to enter the piston chamber, and a ball valve structure adjacent the bottom surface of the upper deck cooperates with the air intake orifice to control the flow of air through the air intake orifice.

18 Claims, 11 Drawing Sheets

(51) Int. Cl.
*G01F 11/26* (2006.01)
*G01F 11/28* (2006.01)

(58) Field of Classification Search
USPC ....... 222/442, 453, 476, 477, 500, 213, 207, 222/211, 212
See application file for complete search history.

(56) References Cited

U.S. PATENT DOCUMENTS

| | | | | |
|---|---|---|---|---|
| 3,156,386 A | * | 11/1964 | Kuechenmeister | A47G 19/34 222/372 |
| 4,807,785 A | * | 2/1989 | Pritchett | G01F 11/263 222/442 |
| 4,811,871 A | * | 3/1989 | Wass | B67C 9/00 222/212 |
| 4,946,080 A | * | 8/1990 | Vesborg | G01F 11/263 222/212 |
| 4,972,977 A | * | 11/1990 | Moss | B05B 11/02 222/207 |
| 5,033,654 A | * | 7/1991 | Bennett | B05B 7/0037 222/190 |
| 5,251,792 A | * | 10/1993 | Sheen | B05B 11/047 222/205 |
| 5,904,272 A | * | 5/1999 | Kaufman | A47K 5/1202 222/207 |
| 6,343,716 B1 | * | 2/2002 | Baudin | G01F 11/04 222/207 |
| 6,419,167 B1 | * | 7/2002 | Fuchs | B05B 11/02 222/389 |
| 7,762,438 B2 | * | 7/2010 | Skillin | B65D 47/0819 215/245 |
| 8,997,788 B2 | * | 4/2015 | Wozna | B05B 11/047 137/843 |
| 9,004,318 B2 | * | 4/2015 | Kodama | B05B 7/0037 222/145.5 |
| 10,159,998 B2 | * | 12/2018 | Skillin | B05B 11/0032 |
| 2014/0008398 A1 | * | 1/2014 | Law | G01F 11/263 222/477 |
| 2015/0001260 A1 | | 1/2015 | Hoshino | |
| 2016/0138953 A1 | * | 5/2016 | Greiner-Perth | G01F 11/263 222/213 |
| 2016/0311586 A1 | * | 10/2016 | Santagiuliana | B65D 47/2062 |
| 2017/0276531 A1 | * | 9/2017 | Jaeckel | B05B 11/007 |

* cited by examiner

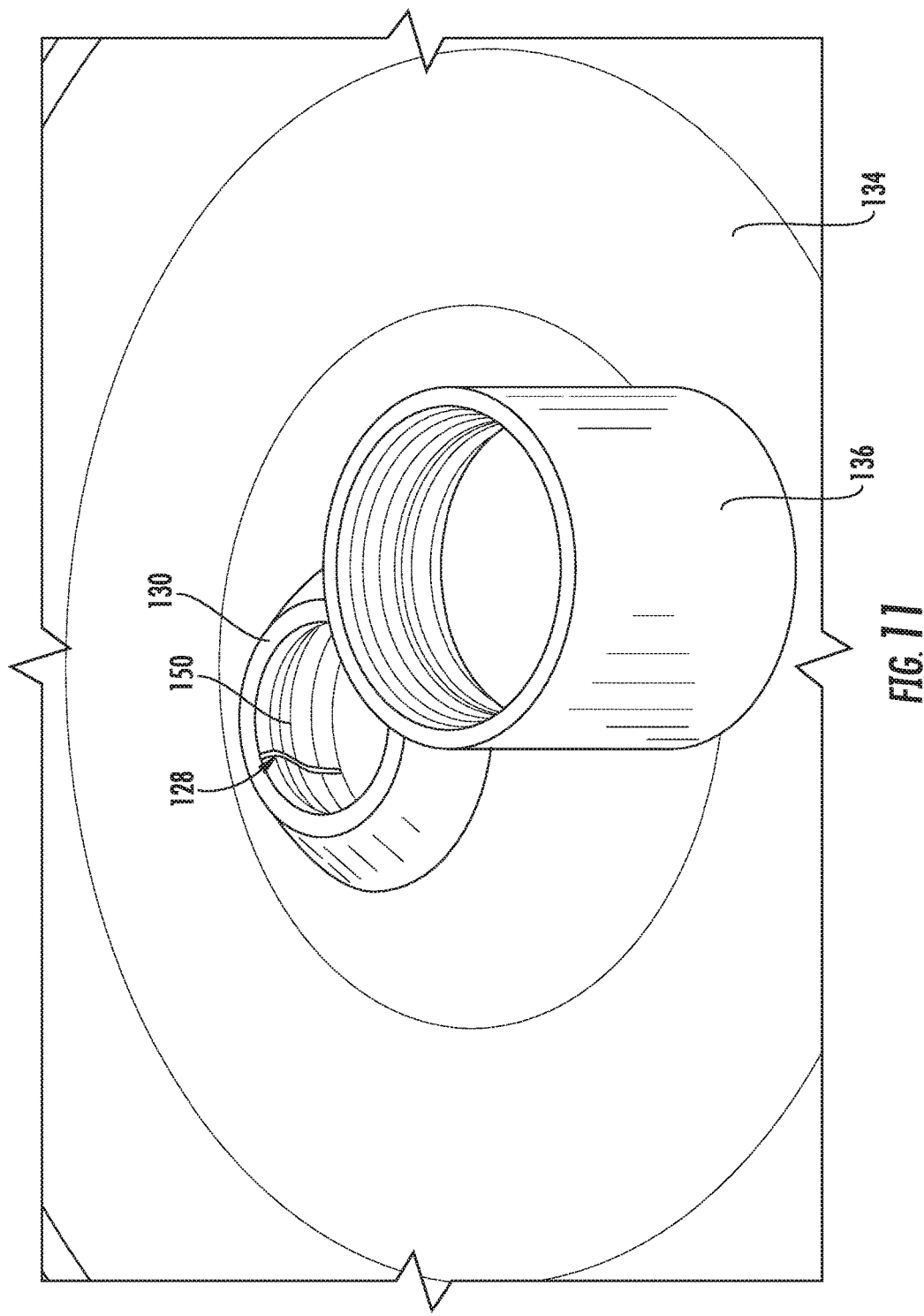

MEASURED DOSE DISPENSERS AND METHODS OF USING SAME

BACKGROUND OF THE INVENTION (1) Field of the Invention

The instant invention relates to dispensing closures for containers for flowable products such as personal care products, concentrated beverages, food products, home and garden chemical products, healthcare products, etc. More specifically, the invention relates to a dispensing closure having piston timer which controls dispensing of a measured dose of product responsive to squeezing pressure on the product container.

(2) Description of Related Art

Dispensing closures are used in a variety of industries for dispensing various liquid or flowable products. As integrated dispensing closures become more prevalent in all industries, consumer desire presses for their use on an ever expanding array of products and packages, while product manufacturers search for unique solutions at the lowest possible cost to promote sales and maintain profit margins.

SUMMARY OF THE INVENTION

The present invention is directed to a 3-piece dispensing closure for dispensing a measured dose of a flowable product from a squeeze-type product container. Generally, the product container is molded from a flexible plastic and is sufficiently pliable such that a user may readily squeeze the container to apply pressure to the flowable product contained therein.

The dispensing closure comprises a closure body, a closure lid connected to the closure body by a living hinge, a timing piston which controls dispensing of a measured dose of product responsive to squeezing pressure on the product container, a timing vent which allows air out of the timing piston, an air intake to allow air back into the piston, and a ball valve structure for controlling the flow of air through the air intake.

The closure body has an upper deck, a dispensing orifice within the upper deck, and an inner skirt depending downwardly from the upper deck. The inner skirt may include threads configured for engagement with the threaded neck of the product container.

The timing piston comprises a tubular piston guide extending downwardly from a bottom surface of the upper deck and a cup-shaped piston body which is slidably received on the piston guide. The dispensing orifice in the upper deck is located immediately adjacent the outside edge of the piston guide. The piston body further has a flared neck portion at the upper peripheral edge. When assembled together, the piston body cooperates with the piston guide to form an enclosed piston chamber. In operation, the piston body is slidably movable between an open position wherein the flared neck is spaced from the dispensing orifice, and a closed position wherein the flared neck is adjacent the bottom surface of the upper deck and closes off the dispensing orifice.

The timing vent is a small orifice located within the upper deck in communication with the piston chamber to allow air to escape from the piston chamber during the dispensing stroke.

The air intake orifice is a larger orifice also within the upper deck to allow air to flow back into the piston chamber during the reset stroke.

The ball valve structure is located adjacent the bottom surface of the upper deck within the piston chamber and cooperates with the air intake orifice the controlling the flow of air through the air intake orifice. More specifically, the ball valve structure comprises a ball valve seat formed around a peripheral lower edge of said the intake orifice, a ball valve, and a ball valve retaining structure extending downwardly from the bottom surface of the upper deck. The ball valve retaining structure surrounds the air intake orifice and the ball valve is received the ball valve retaining structure where it is movable between a closed position where the ball valve is received in the ball valve seat, and an open position where the ball valve is spaced from the ball valve seat.

In operation, the container is inverted so that the dispensing orifice is facing downwardly. In the inverted, at rest position, the piston body is extended to the open position, i.e. dispensing orifice is open, and the ball valve is in the closed position (blocking the air intake). The dispensing stroke is started by squeezing the container which creates pressure within the container and in turn forces the piston body to move towards the closed position. Under pressure, air inside the piston chamber escapes through the timing vent, allowing the piston body to move towards the closed position. Concurrently, during the piston movement, the internal pressure also dispenses product through the open dispensing orifice. At the end of the dispensing stroke, the piston body is moved to the closed position where the flared neck engages the bottom surface of the upper deck and closes off the dispensing orifice. Adjusting the size of the timing vent will vary the time needed for the piston to move and in turn vary the volume of product dispensed.

The reset stroke is automatically started by removing the squeezing pressure from the container, creating a reverse vacuum which draws the piston body from the closed position back towards the open position. This motion draws the ball valve from its closed position to the open position quickly allowing a larger volume of air back into the piston chamber (faster reset). Once the reset stroke is complete (piston body back in the extended open position), the ball valve will again fall back into the closed position, ready for the next cycle.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

FIGS. 9-11 are views of another exemplary embodiment.

DETAILED DESCRIPTION OF THE INVENTION

Figure 10:
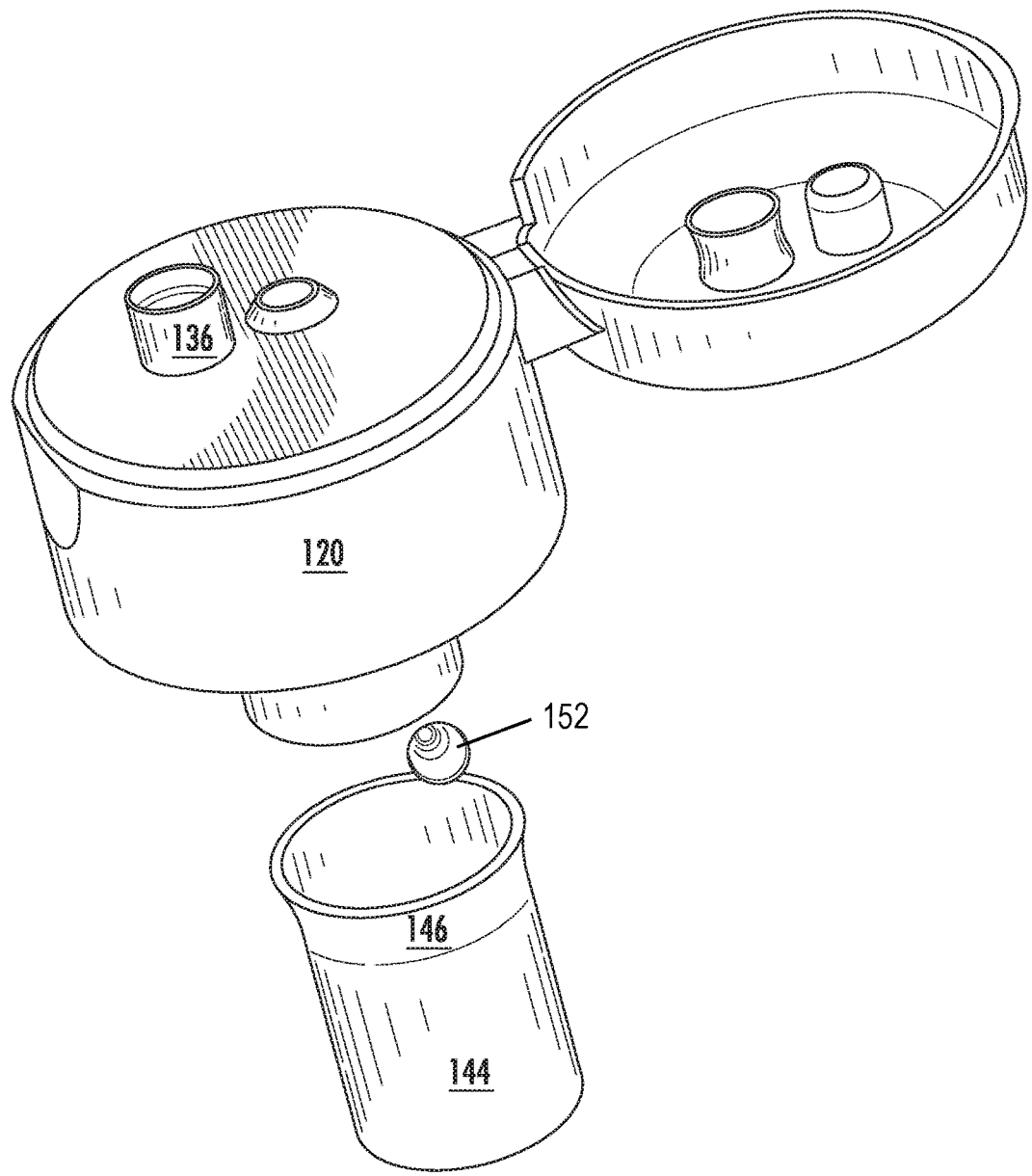

Referring now to the drawings, an exemplary embodiment of the invention is generally indicated at 10 in FIG. 10.

The present invention is directed to a 3-piece dispensing closure 10 for dispensing a measured dose of a flowable product 12 from a squeeze-type product container 14.

Generally, the product container 14 is molded from a flexible plastic and has a main body portion 16 that is sufficiently pliable such that a user may readily squeeze the container to apply pressure to the flowable product contained 12 therein. Preferably, the container 14 also may include a threaded neck 18, although other removable connection methods are also contemplated herein.

The dispensing closure 10 comprises a closure body 20, a closure lid 22 connected to the closure body 20 by a living hinge 24, a timing piston 26 which controls dispensing of a measured dose of product responsive to squeezing pressure on the product container 14, a timing vent 28 which allows air out of the timing piston 26, an air intake 30 to allow air back into the timing piston 26, and a ball valve structure 32 for controlling the flow of air through the air intake 30. The dispensing closure body 20, closure lid 22, and timing piston 26 are preferably molded from plastic, although other materials are also contemplated.

The closure body 20 has an upper deck 34, a dispensing orifice 36 within the upper deck 34, and an inner skirt 38 depending downwardly from the upper deck 34. The inner skirt 38 may include threads configured for engagement with the threaded neck 18 of the product container 14. The closure body 20 may also include an outer decorative skirt 40 shaped to blend with the outside shape of the product container 14. However, the outer skirt 40 is not required for functionality of the closure.

The timing piston 26 comprises a tubular piston guide 42 extending downwardly from a bottom surface of the upper deck 34 and a cup-shaped piston body 44 which is slidably received on the piston guide 42. The dispensing orifice 36 in the upper deck 34 is located immediately adjacent the outside edge of the piston guide 42. The piston body 44 further has a flared neck portion 46 at the upper peripheral edge thereof. When assembled together, the piston body 44 cooperates with the piston guide 42 to form an enclosed piston chamber 48. The piston guide 42 and piston body 44 may be provided with interference stops (not illustrated), such as inward and outward concentric ribs, which prevent the piston body 44 from becoming disassembled from the piston guide 42 after assembly.

Figure 1:
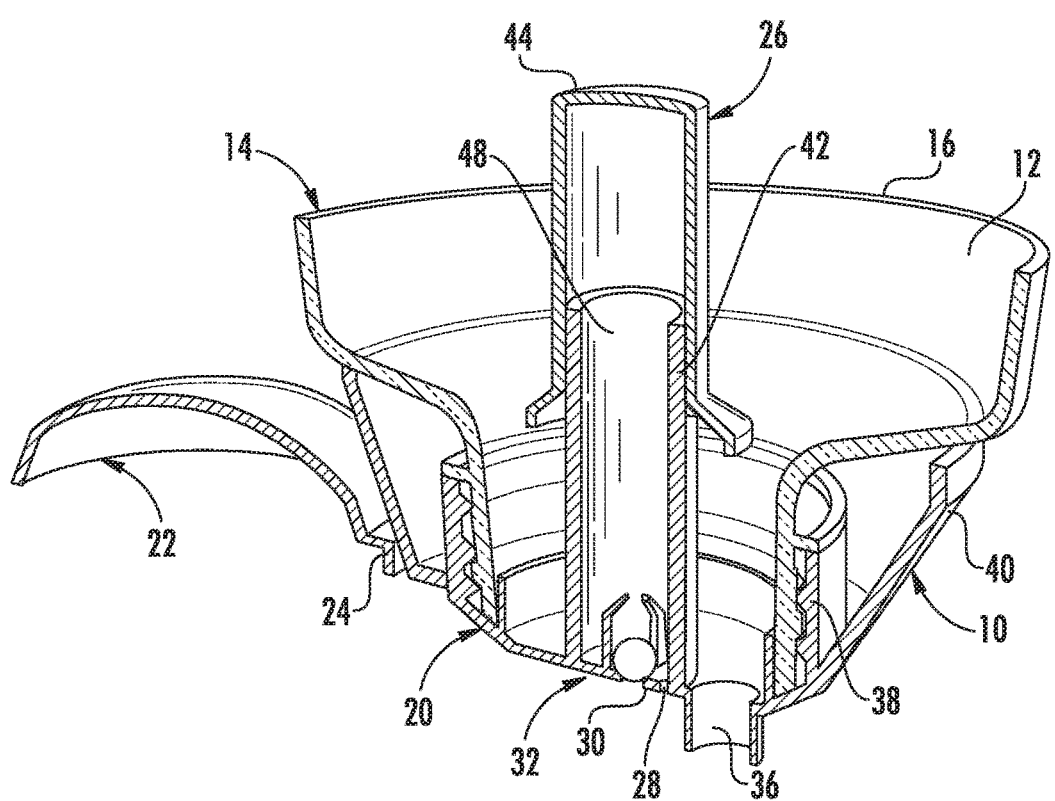
FIG. 1 is a cross-sectional view of an exemplary embodiment.
Figure 2:
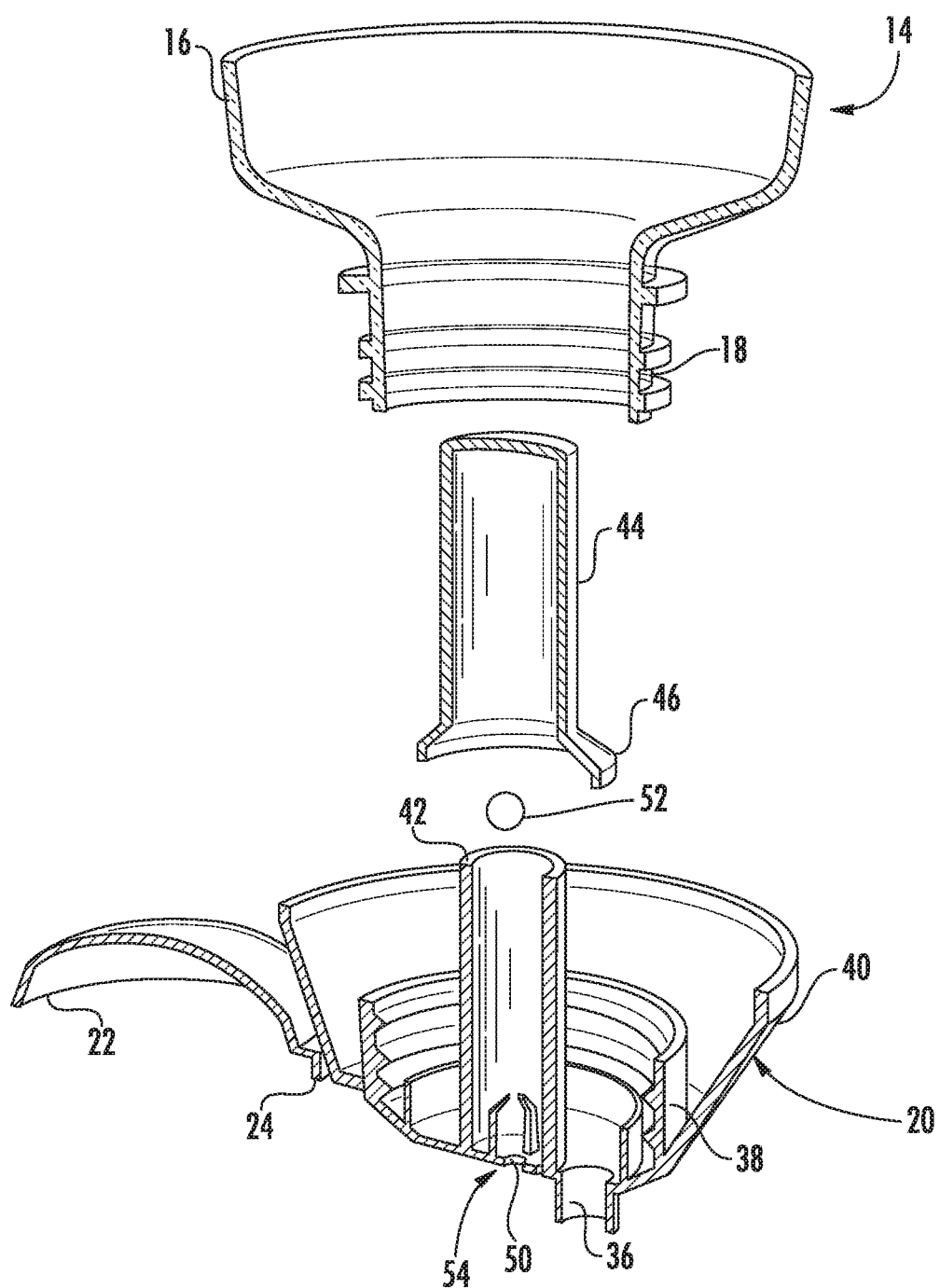
FIG. 2 is an exploded cross-sectional view thereof.
Figure 3:
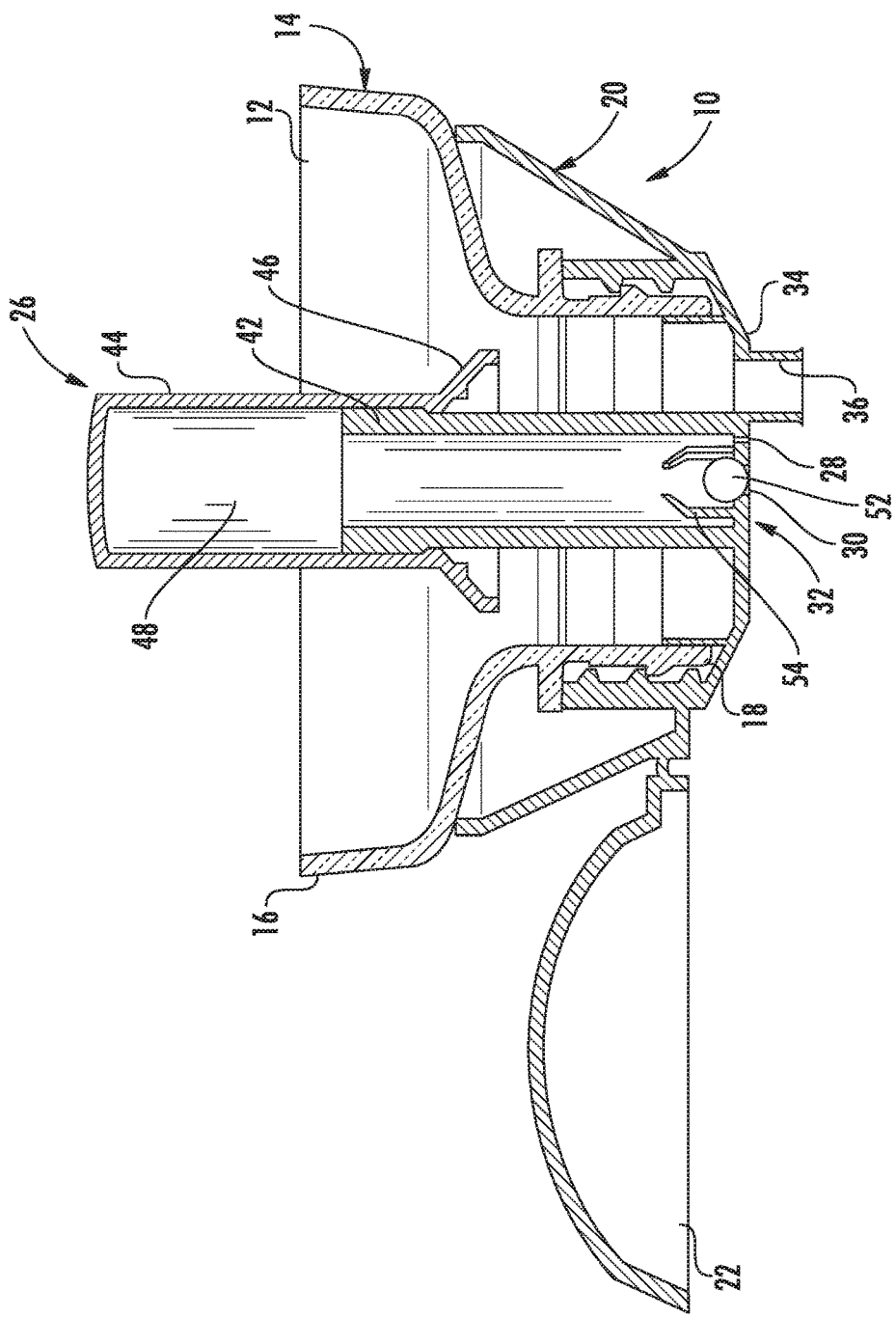
FIGS. 3-8 are step-wise cross-sectional views thereof showing a complete dispensing cycle starting and ending at the open at-rest position.

In operation, the piston body 44 is slidably movable between an open position (FIGS. 1, 3 and 8) wherein the flared neck 46 is spaced from the dispensing orifice 36, and a closed position (FIG. 5) wherein the flared neck 46 is adjacent the bottom surface of the upper deck 34 and closes off the dispensing orifice 36.

Figure 4:
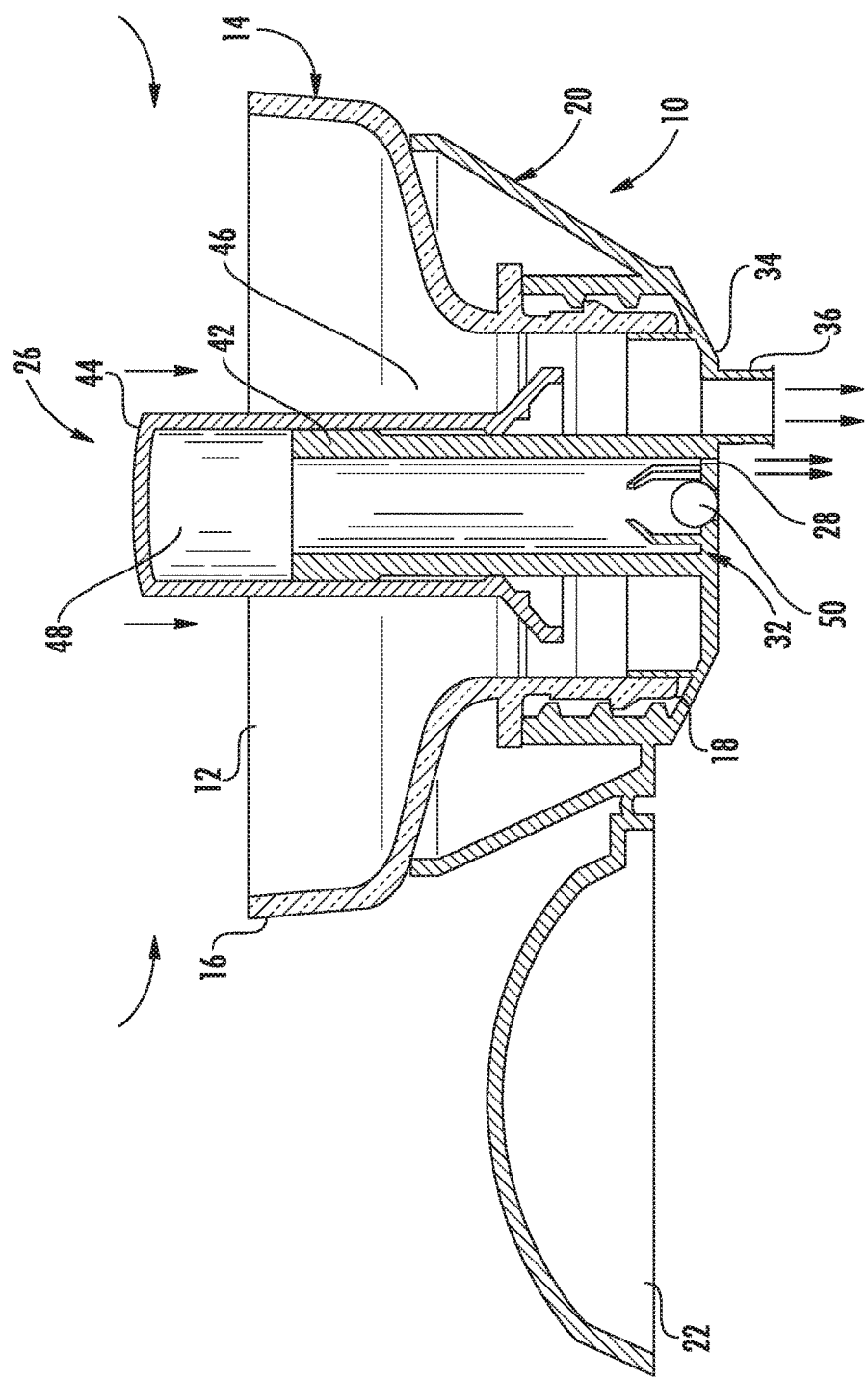

The timing vent 28 is a small orifice located within the upper deck 34 in communication with the piston chamber 48 to allow air to escape from the piston chamber 48 during the dispensing stroke (FIG. 4).

Figure 6:
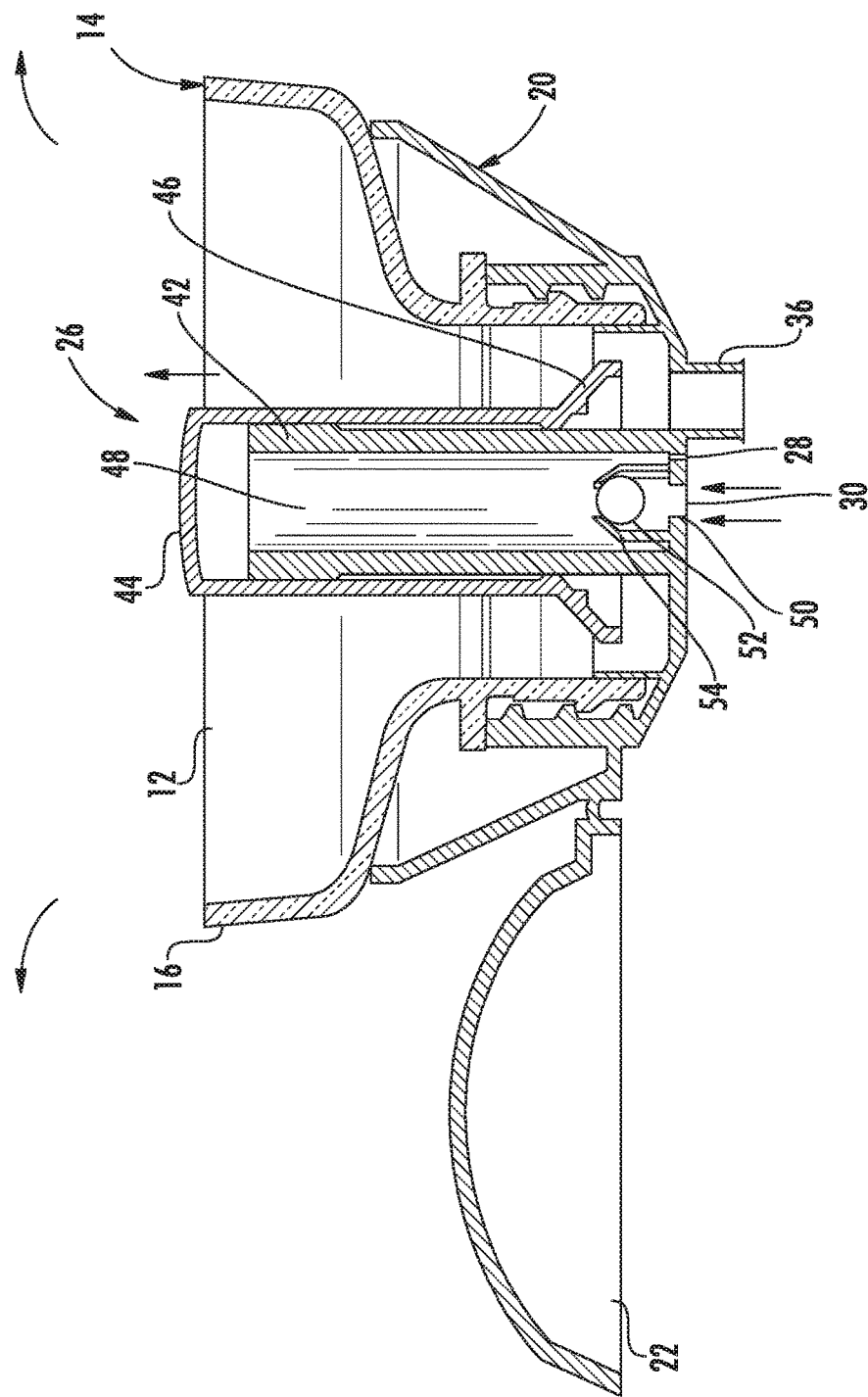
Figure 7:
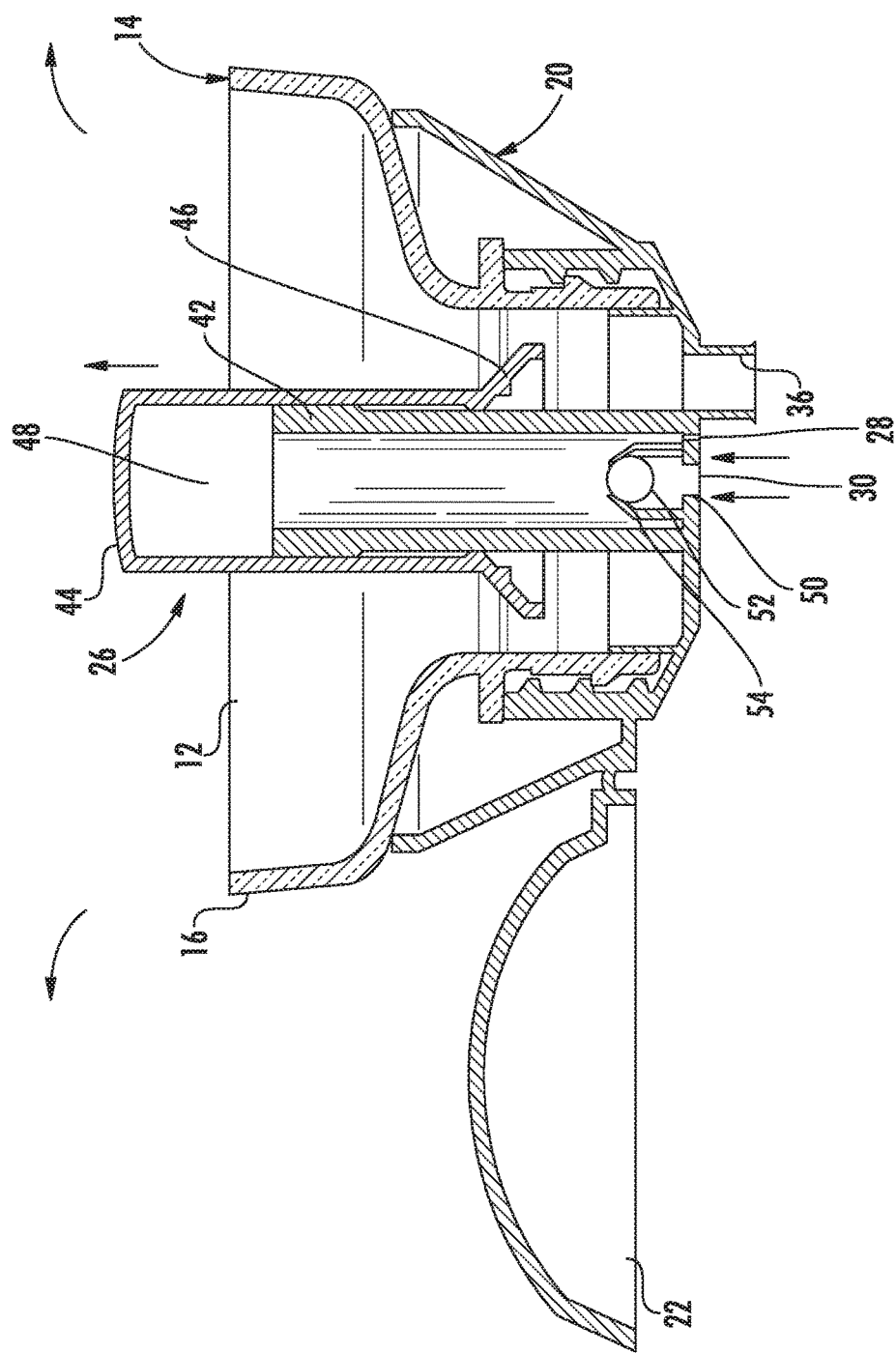

The air intake orifice 30 is a larger orifice also within the upper deck 34 to allow air to flow back into the piston chamber 48 during the reset stroke (FIGS. 6-7).

The ball valve structure 32 is located adjacent the bottom surface of the upper deck 34 within the piston chamber 48 and cooperates with the air intake orifice 30 to control the flow of air through the air intake orifice 30. More specifically, the ball valve structure 32 comprises a ball valve seat 50 formed around a peripheral lower edge of the intake orifice 30, a ball valve 52, and a ball valve retaining structure 54 extending downwardly from the bottom surface of the upper deck 34. The ball valve retaining structure 54 surrounds the air intake orifice 30 and comprises 4 spaced retaining arms. The ball valve 52 is received within the ball valve retaining structure 54 where it is movable between a closed position (FIGS. 1, 3 and 8) where the ball valve 52 is received in the ball valve seat 50, and an open position (FIGS. 6-7) where the ball valve 52 is spaced from the ball valve seat 50.

Figure 5:
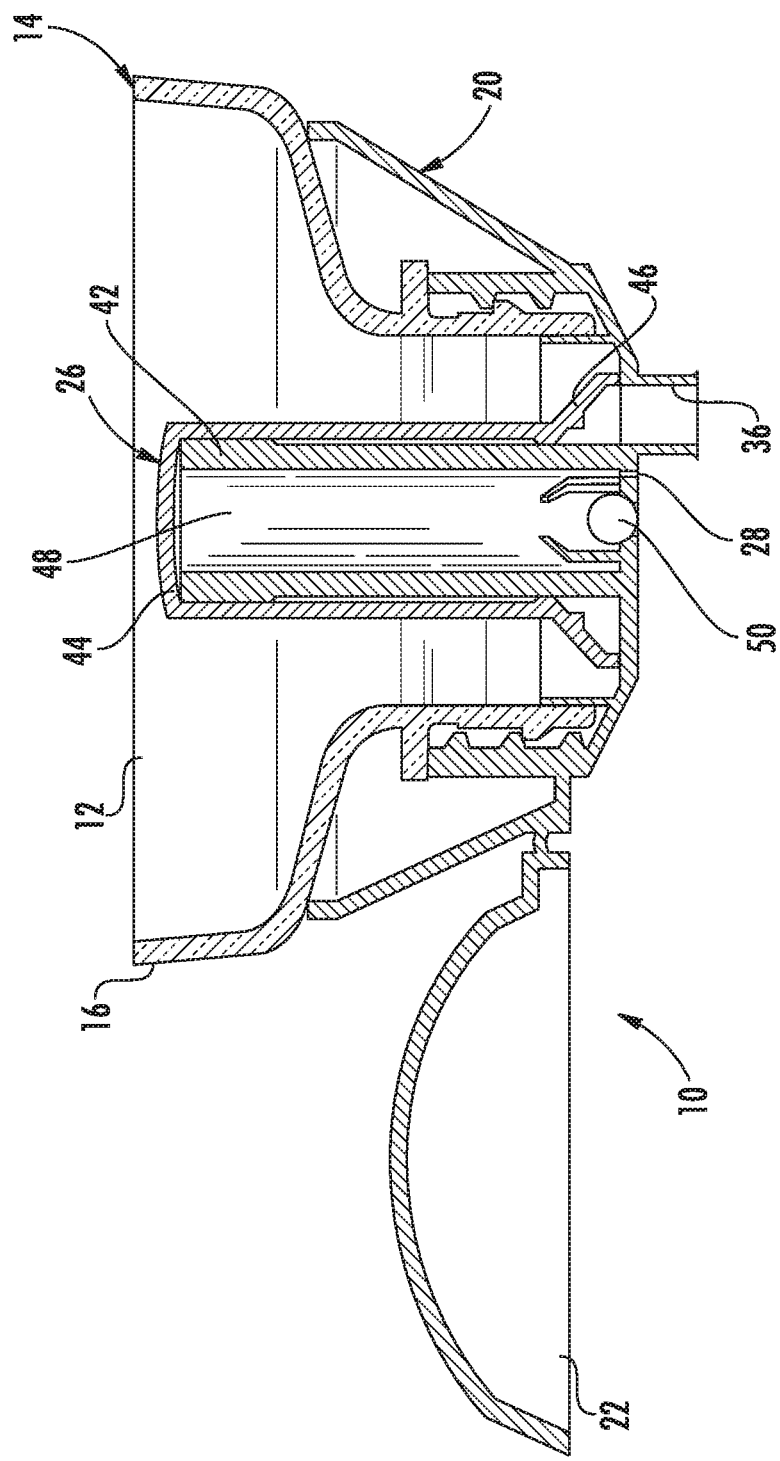

In operation, the container 14 is inverted so that the dispensing orifice 36 is facing downwardly. In the inverted, at rest position, the piston body 44 is extended to the open position (FIGS. 1, 3 and 8), i.e. dispensing orifice 36 is open, and the ball valve 52 is in the closed position (blocking the air intake 30). The dispensing stroke (FIG. 4) is started by squeezing the container 14 which creates pressure within the container 14 and in turn forces the piston body 44 to move towards the closed position (FIG. 5). Under pressure, air inside the piston chamber 48 escapes through the timing vent 28, allowing the piston body 44 to move towards the closed position (FIG. 5). Concurrently, during the piston movement, the internal pressure also dispenses product 12 through the open dispensing orifice 36. At the end of the dispensing stroke, the piston body 44 is moved to the closed position (FIG. 5) where the flared neck 46 engages the bottom surface of the upper deck 34 and closes off the dispensing orifice 36. Adjusting the size of the timing vent 28 will vary the time needed for the piston body 44 to move and in turn vary the volume of product dispensed.

Figure 8:
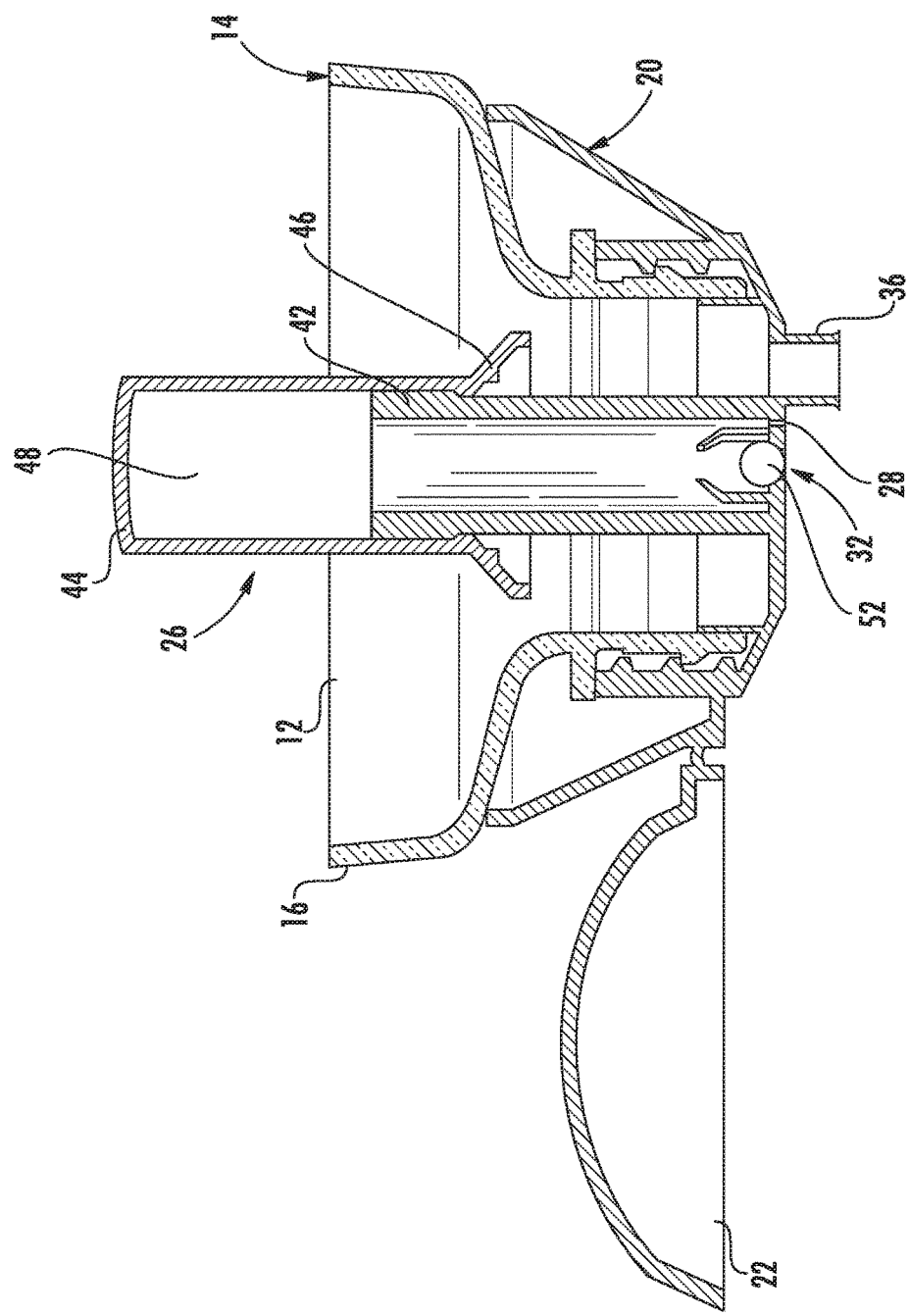

The reset stroke (FIGS. 6-7) is automatically started by removing the squeezing pressure from the container 14, creating a reverse vacuum which draws the piston body 44 from the closed position (FIG. 5) back towards the open position (FIG. 8). This motion draws the ball valve 52 from its closed position (FIG. 5) to the open position (FIGS. 6-7) quickly allowing a larger volume of air back into the piston chamber 48 (faster reset). This reverse motion of the piston body 44 also creates a "suck-back" effect at the dispensing orifice 36 preventing any product 12 from dripping from the dispensing orifice 36 after the squeezing pressure is removed. Once the reset stroke is complete (piston body back in the extended open position) (FIG. 8), the ball valve will again fall back into the closed position, ready for the next cycle.

The amount of the measured dose and the speed of dispensing and refilling can be easily adjusted by one skilled in the art by varying the sizes of the piston chamber 48, the timing vent 28, and the air intake aperture 30. Additionally, a change in the viscosity of the product would also change the amount of the measured dose and the speed of dispensing and refilling for a fixed set of dimensions.

Figure 9:
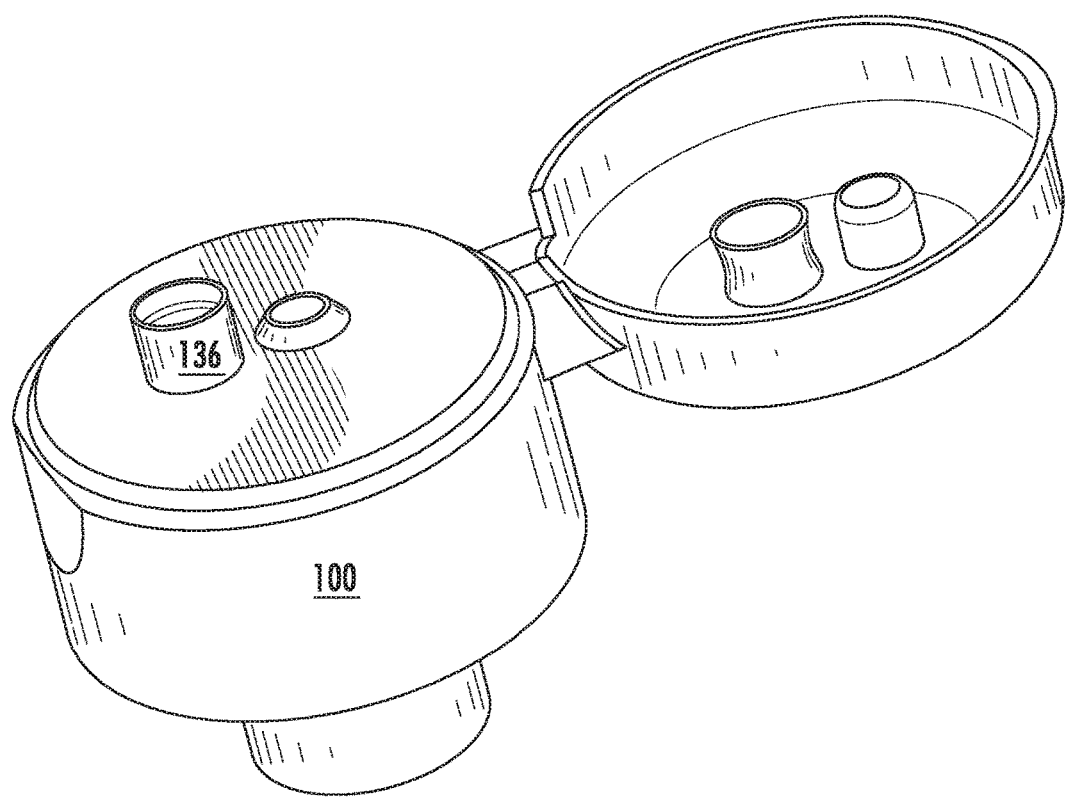

Referring now to FIGS. 9-11, another exemplary embodiment of the invention is illustrated and is generally indicated at 100. The structural and functional features of this closure 100 are essentially identical to the earlier described embodiment with two exceptions. In this embodiment, the dispensing orifice 136 is moved concentrically inward, slightly closer to the central axis. This move allows the flared neck 146 of the timing piston body 144 to be slightly smaller. Additionally, the timing vent 128 is integrated into the valve seat 150 in the air intake orifice 130.

Referring to FIG. 11, the timing vent 128 comprises a small slit formed in the surface of the valve seat 150. When the ball valve 152 is seated therein, the small slit 128 remains unblocked and allows for the travel of air outwardly as described hereinabove.

It can therefore be seen that the exemplary embodiments provide a dispensing closure which is uniquely effective for automatically, dispensing a measured dose of flowable product 12 from a squeeze type container 14.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A dispensing closure for dispensing a flowable product from a squeeze-type product container comprising:
   a closure body having an upper deck and a dispensing orifice within said upper deck, said closure body being configured to attach to a product container;
   a timing piston comprising a tubular piston guide extending downwardly from a bottom surface of said upper deck and a cup-shaped piston body slidably received on said piston guide, said piston body further having a flared neck portion, said piston body cooperating with said piston guide to form an enclosed piston chamber,
   a timing vent within said upper deck in communication with said piston chamber to allow air to escape said piston chamber;
   an air intake orifice within said upper deck to allow air to enter said piston chamber; and
   a ball valve structure adjacent the bottom surface of the upper deck and cooperating with said air intake orifice for controlling the flow of air through the air intake orifice.

2. The dispensing closure of claim 1 wherein said dispensing orifice is located adjacent said piston guide, said piston body being slidably movable between an open position wherein said flared neck is spaced from said dispensing orifice, and a closed position wherein said flared neck is adjacent said bottom surface of said upper deck and closes said dispensing orifice.

3. The dispensing closure of claim 1 wherein said ball valve structure comprises:
   a ball valve seat formed around a peripheral lower edge of said air intake orifice;
   a ball valve;
   a ball valve retaining structure extending downwardly from the bottom surface of the upper deck, said ball valve retaining structure surrounding said air intake orifice, said ball valve being received within the ball valve retaining structure and being movable between a closed position wherein said ball valve is received in the ball valve seat, and an open position wherein said ball valve is spaced from the ball valve seat.

4. The dispensing closure of claim 2 wherein said ball valve structure comprises:
   a ball valve seat formed around a peripheral lower edge of said air intake orifice;
   a ball valve;
   a ball valve retaining structure extending downwardly from the bottom surface of the upper deck, said ball valve retaining structure surrounding said air intake orifice, said ball valve being received within the ball valve retaining structure and being movable between a closed position wherein said ball valve is received in the ball valve seat, and an open position wherein said ball valve is spaced from the ball valve seat.

5. The dispensing closure of claim 1 further comprising a closure lid connected to said closure body, said closure lid including a sealing structure received in interfitting engagement with the dispensing orifice to selectively prevent flowable product from exiting the dispensing orifice.

6. The dispensing closure of claim 2 further comprising a closure lid connected to said closure body, said closure lid including a sealing structure received in interfitting engagement with the dispensing orifice to selectively prevent flowable product from exiting the dispensing orifice.

7. The dispensing closure of claim 3 further comprising a closure lid connected to said closure body, said closure lid including a sealing structure received in interfitting engagement with the dispensing orifice to selectively prevent flowable product from exiting the dispensing orifice.

8. The dispensing closure of claim 4 further comprising a closure lid connected to said closure body, said closure lid including a sealing structure received in interfitting engagement with the dispensing orifice to selectively prevent flowable product from exiting the dispensing orifice.

9. A dispensing closure for dispensing a flowable product from a squeeze-type product container comprising:
   a closure body having an upper deck, a dispensing orifice within said upper deck, and an inner skirt depending downwardly from said upper deck, said inner skirt being configured to attach to a product container;
   a timing piston comprising a tubular piston guide extending downwardly from a bottom surface of said upper deck and a cup-shaped piston body slidably received on said piston guide, said piston body further having a flared neck portion, said piston body cooperating with said piston guide to form an enclosed piston chamber,
   said dispensing orifice being located adjacent said piston guide,
   said piston body being slidably movable between an open position wherein said flared neck is spaced from said dispensing orifice, and a closed position wherein said flared neck is adjacent said bottom surface of said upper deck and closes said dispensing orifice;
   a timing vent within said upper deck in communication with said piston chamber to allow air to escape said piston chamber;
   an air intake orifice within said upper deck to allow air to enter said piston chamber; and
   a ball valve structure adjacent the bottom surface of the upper deck and cooperating with said air intake orifice for controlling the flow of air through the air intake orifice.

10. The dispensing closure of claim 9 wherein said ball valve structure comprises:
    a ball valve seat formed around a peripheral lower edge of said air intake orifice;
    a ball valve;
    a ball valve retaining structure extending downwardly from the bottom surface of the upper deck, said ball valve retaining structure surrounding said air intake orifice, said ball valve being received within the ball valve retaining structure and being movable between a closed position wherein said ball valve is received in the ball valve seat, and an open position wherein said ball valve is spaced from the ball valve seat.

11. The dispensing closure of claim 9 further comprising a closure lid connected to said closure body by a living hinge.

12. The dispensing closure of claim 10 further comprising a closure lid connected to said closure body by a living hinge.

13. The dispensing closure of claim 11 wherein said closure lid includes a sealing structure received in interfitting engagement with the dispensing orifice to selectively prevent flowable product from exiting the dispensing orifice.

14. The dispensing closure of claim 12 wherein said closure lid includes a sealing structure received in interfitting engagement with the dispensing orifice to selectively prevent flowable product from exiting the dispensing orifice.

15. The dispensing closure of claim 1, wherein the dispensing orifice, timing vent, and air intake orifice are all disposed on a single surface of the upper deck.

16. The dispensing closure of claim 1, wherein the dispensing orifice, timing vent, and air intake orifice each have respective central axes, and each of the respective axes are parallel to one another.

17. The dispensing closure of claim 9, wherein the dispensing orifice, timing vent, and air intake orifice are all disposed on a single surface of the upper deck.

18. The dispensing closure of claim 9, wherein the dispensing orifice, timing vent, and air intake orifice each have respective central axes, and each of the respective axes are parallel to one another.

* * * * *